C. L. NORTON.
BRICK MACHINE.
APPLICATION FILED MAY 17, 1921.

1,434,662.

Patented Nov. 7, 1922.
8 SHEETS—SHEET 1.

C. L. NORTON.
BRICK MACHINE.
APPLICATION FILED MAY 17, 1921.

1,434,662.

Patented Nov. 7, 1922.

C. L. NORTON.
BRICK MACHINE.
APPLICATION FILED MAY 17, 1921.

1,434,662.

Patented Nov. 7, 1922.
8 SHEETS—SHEET 7.

Inventor,
Charles L. Norton,
by Roberts, Roberts & Cushman
his Attys.

Patented Nov. 7, 1922.

1,434,662

UNITED STATES PATENT OFFICE.

CHARLES L. NORTON, OF NEWTON, MASSACHUSETTS, ASSIGNOR TO REFRACTORIES MACHINERY MANUFACTURING COMPANY, OF PITTSBURGH, PENNSYLVANIA, A CORPORATION OF PENNSYLVANIA.

BRICK MACHINE.

Application filed May 17, 1921. Serial No. 470,266.

*To all whom it may concern:*

Be it known that I, CHARLES L. NORTON, a citizen of the United States of America, and resident of Newton, in the county of Middlesex and State of Massachusetts, have invented new and useful Improvements in Brick Machines, of which the following is a specification.

This invention relates to mechanism of that type which is employed in the manufacture of moulded shapes such as brick, tile and the like and more particularly to an apparatus of this character in which the plastic or semi-plastic material for forming such shapes is introduced into suitable hollow moulds from which it is automatically discharged after the completion of the moulding operation. The present invention although of more general application, is herein disclosed as applied to a machine substantially of the type disclosed in the patent to Norton, No. 1,322,677, March 2, 1920. In the machine illustrated in the above patent, the plastic material is deposited in open topped moulds which are caused to travel in an endless path by connections to a chain or other suitable drive element. The moulds travel past the charging devices in a substantially horizontal path, and then move down over a guide drum or sprocket wheel until they are completely inverted. As the moulds are carried down over such drum or wheel, cover members or pallets are applied to the open tops of the moulds and such pallets serve to prevent the spilling of the mould contents and to support the moulded shape as the mould moves into completely inverted position. While in the latter position the mould is caused to travel along a path slightly inclined to the horizontal, during which time the moulded shapes are forced out of the mould cavities, such shapes then resting upon their respective pallets. The pallets with their loads are moved along by a suitable traveling conveyer until brought to the point of discharge, whence the operator may remove the pallets with the moulded shapes thereon for subjecting the latter to a subsequent operation.

In the machine disclosed in the above patent, the pallets are provided with outstanding lugs or projections for engagement with the moulds, whereby the latter serve positively to move the pallets throughout the path of travel of the latter. Such lugs or projections upon the pallets are however, regarded as undesirable from a practical standpoint, as they interfere to some extent with subsequent operations to which the moulded shapes with their supporting pallets may be subjected. One object of the present invention is to provide for the proper application of pallets to the moulds and their positive movement therewith, without necessitating the employment of pallets of special or unusual form. As one mode of attaining this result, there may be provided carriers in the form of receptacles or pans for holding the pallets for presentation to the moulds, and such pans or receptacles may have suitable lugs or bosses for engagement with proper elements carried by the moulds, whereby the latter serve in a positive manner to move the pans with their included pallets. With this arrangement, a pallet or mould cover of any ordinary form may be employed, while at the same time relative slippage of such pallet and the mould is avoided.

While a belt or belts may be employed for presenting the individual pallet pans to the moulds and for holding them in engagement with the moulds during the inversion of the latter, it is considered somewhat undesirable from a practical standpoint to employ a belt for this purpose, as a belt under the conditions of use to which it is subjected in a machine of this character rapidly deteriorates to such an extent as to permit relative movement of the moulds and pans with the pallets carried thereby.

A further object of the present invention is to provide suitable automatic means for presenting pallets in operative relation to the moulds and for moving them with the moulds in the subsequent travel of the latter to the point of discharge. This object may be attained by the employment of an endless chain having the pans fixedly secured thereto in properly spaced relation, together with means for traversing said chain with its pans in such manner as to cause the pans to register with the traveling moulds, thereby securely holding the pallets within the pans in proper position relatively to the moulds until the latter reach that point in their travel at which the moulded shapes are discharged.

By reason of the fact that the moulds are secured to a substantially inextensible chain which travels over the periphery of a drum or wheel as aforesaid, it follows that the distances between the outer, or pallet engaging portions, of successive moulds, vary as the moulds pass from the curved portion of their path about the drum to the tangential or straight part of such path. So long as the pallets or their supporting pans are not connected one to another, this is a negligible matter, but when it is attempted to secure the pallet pans to an endless chain, difficulties immediately arise due to the fact that the pans, which necessarily travel in a circular path of greater radius than the moulds during a portion of their movement, will be found to have an excessive speed when passing into the straight part of their path. Thus the pans with their pallets tend to part company with their respective moulds. Any relative movement of such parts is, however, extremely undesirable, such movement resulting in the production of brick having rounded corners or feather edges, rendering them unfit for use. A further object of this invention is to provide for the mounting of the pallet carriers upon an endless chain, while at the same time permitting the synchronous movement of the moulds and pallet carrying pans throughout their entire path of cooperative movement. To this end it is proposed to provide a pan-carrying chain which has sufficient slack in that portion which lies adjacent the mould-carrying chain, to permit each mould to pick up and advance its corresponding pallet pan at a speed independent of that imparted to adjacent pans. In order to permit of such an arrangement, the pan-carrying chain may be passed over a drive sprocket closely adjacent that end of the machine at which the pallets are applied to the moulds. This sprocket pulls upon the idle run of chain leading from the discharge end of the machine, and feeds the chain in slack loops or bights, over into proximity to the downgoing series of filled moulds.

As the slack chain is fed over toward the oncoming moulds, it is necessary to provide some means for temporarily detaining the pans until picked up by the proper moulds. In accordance with the present invention there may be provided a weighted latch lever whose free end normally lies in the path of the pan carrying chain and in a position to engage and support a pan travelling therewith. Such latch lever will freely yield, however, upon positive engagement of a mould with the pan, whereby to permit the escape of such pan, but will immediately swing back into position to retain the next succeeding pan.

The slack chain as it is fed along by its drive sprocket of course tends to sag away from the moulds and would thus fail to maintain the pallets in proper contact with their respective moulds. A further object of the present invention is to provide for the proper positioning of the pans carried by the slack run of chain as they move downwardly opposite the downgoing moulds. To this end various means may be employed. In accordance with one design, the downgoing pans may be supported by means of a curved guide rail or rails having portions substantially concentric with the sprocket wheel or drum over which the mould carrying chain passes. These rails may be rigid or of resilient character, as desired. In a preferred arrangement, the rails may have associated therewith a movable endless belt or cable with which the pans contact and which chain or belt thus serves to relieve the guide rail members of direct frictional engagement with the pans of pallets.

As the pans move downwardly into position for engagement with the corresponding moulds, the pallets are caused to assume a nearly vertical position and, unless positively prevented, might be caused to tip or slide from their pans by the vibration of the machine. For retaining the downgoing pallets in proper position until actually applied to the moulds, a suitable holding device may be supplied such as a short length of chain or cable supported at its upper end so that it hangs down in contact with the surface of the pallet and by its weight acts to prevent tipping of the latter from its pan. As alternative or additional means, a weighted lever may have one arm arranged in position to engage the pallets as the pans travel down, thus pressing the pallets back into the pans.

The present invention further contemplates various other features of improvement relating to the detail structure of the several mechanisms involved, together with adjustments for the various parts, which, while subordinate to the main objects of the invention, are in many of their aspects important from a commercial and practical standpoint. Such features, together with the more basic principles of the invention, will be described hereinafter in greater detail and by specific reference to the accompanying drawings which are appended hereto for purposes of full disclosure and by way of illustration of a preferred embodiment thereof and in which:—

The frame of the machine is indicated generally by the numeral 1, this frame comprising suitable uprights connected by longitudinal girders and transverse struts, conveniently arranged for the support of the various mechanisms comprised in the machine. A vertically disposed chute is indicated at 2, such chute leading from any suitable dumping mechanism such, for example, as that described in the patent to Norton, No. 1,332,677, March 2, 1920. At 3 is shown a compressor wheel and at 4 is a scraping mechanism of substantially the same type as described in the above referred to patent. At 5 is a transversely extending driven shaft having mounted thereon suitable sprocket wheels such as 6, and 7 is a shaft substantially parallel to the shaft 5 and also provided with sprocket wheels, as 8. The shaft 5 is preferably mounted in substantially fixed bearings on girder members 9, while the shaft 7 is adjustably supported upon girders 10 by means of slidable bearings 11 adjustable by means of screw threaded rods 12.

Figure 1:
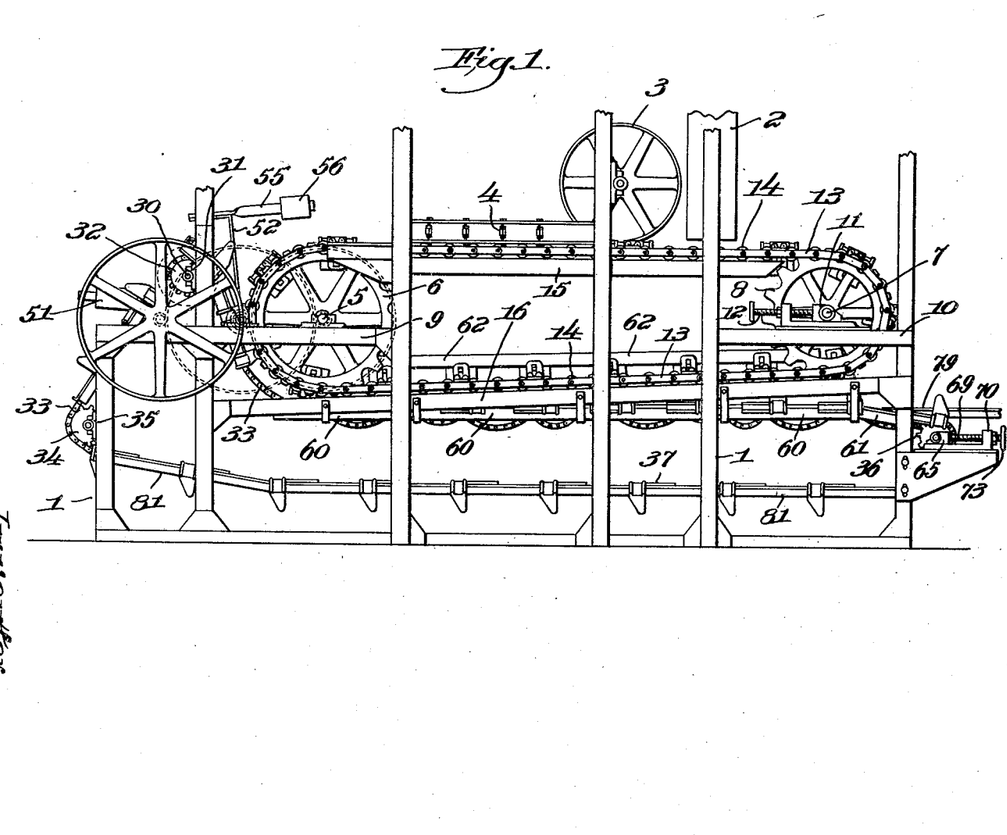
Fig. 1 is a side elevation of a brick moulding machine, certain of the parts being broken away, and illustrating the application of the present invention thereto.

Sprocket chains 13 pass about the pairs of sprocket wheels 6, 8, respectively, and these chains may be kept in properly taut condition by manipulating the screw rods 12. Journaled on the sprocket chain studs are rolls 14 and upon either side of the machine is arranged a longitudinal girder 15 forming a track upon which the rolls 14 of the upper runs of the chains may travel. The chains in their upper runs are thus constrained to move in a fixed path having a definite relation to the pressing wheel 3 and the scraper mechanism 4. In vertical planes below the rails 15 are arranged rails 16, such rails being inclined upwardly toward the delivery end of the machine as indicated in Figure 1.

To the chains 13 are secured a series of mould carriers of a type generally similar to those disclosed in the above referred to patent to Norton. These mould carriers comprise substantially rectangular frames 17 divided by transverse partitions, as 18, into a series of mould cavities 19. These cavities are open at their upper ends but are closed at their lower ends by members 20 forming integral portions of a movable box-like ejector device 21. The several members 20 are separated by slots $20^a$ of a width sufficient to permit the passage of the partitions 18, and the side walls of the device 21 are provided with corresponding slots 22. The slots $20^a$ and 22 as thus arranged serve to permit the movement of the ejector device 21 in the mould carrier whereby to bring the members 20 substantially into the plane of the free edges of the mould cavities. The ejector 21 is thus operative for discharging the moulded shapes from the mould cavities.

For properly guiding the ejector 21 in its movement, it is provided with laterally outstanding pins 23 which engage slots 24 in downwardly projecting flanges 25 secured to the mould carrier. The pins 23 may be of square or rectangular cross section whereby an accurate guiding of the ejector device 21 is obtained.

Figures 2, 12, 13:
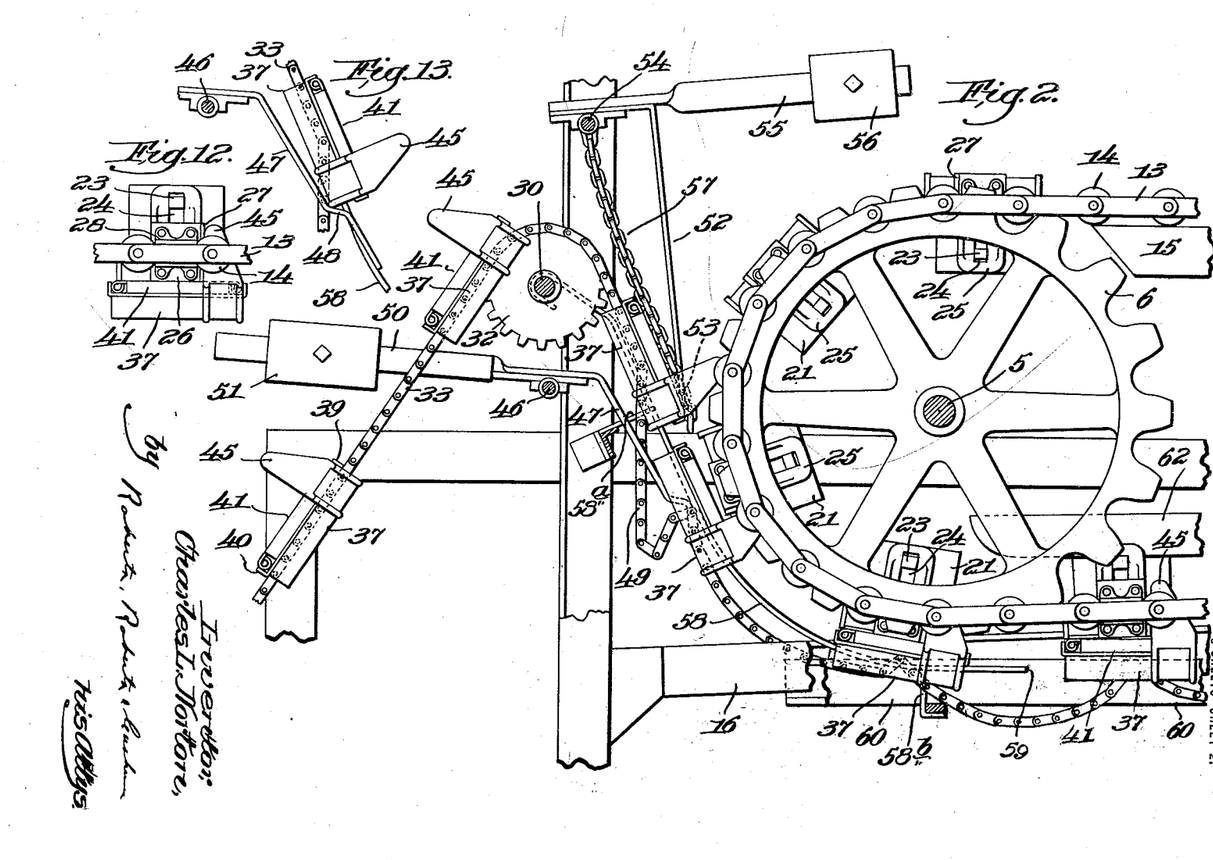
Fig. 2 is a fragmentary side elevation, to larger scale, illustrating details of the pallet feeding end of the machine.
Fig. 12 is a fragmentary detail illustrating the means whereby the mould carrier engages the pallet carrier for propelling the latter.
Fig. 13 is a fragmentary, side elevation illustrating the means for retarding the descent of the pallet carriers.
Figure 10:
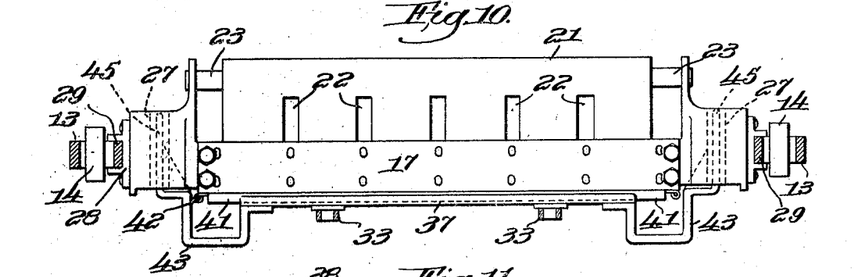
Fig. 10 is a front elevation of the mould carrier in inverted, or dumping position, showing the pallet carrier, and the pallet as covering the open side of the mould carrier.

Projecting from each end of the mould carrier 17 is a driving boss or ear 26 and upon one side of such ear may be secured a wear plate of hardened steel indicated at 27 (see Figs. 10 and 12). Secured to the outer ends of the members 26 are plates 28 to which are connected, by means of rivets or any other desired manner, adjacent links 29 of the respective chains 13. The mould carriers with their ejectors are thus securely held between the chains 13 and are constrained to move with the latter in an endless path.

Figure 8:
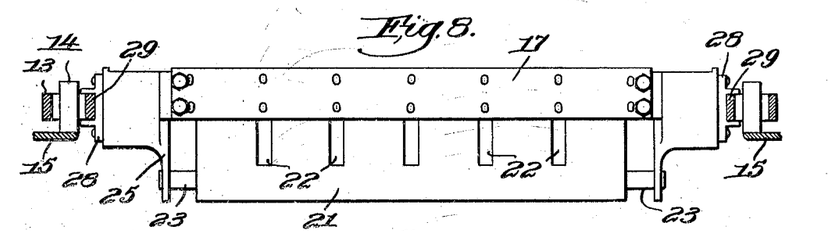
Fig. 8 is a front elevation, to large scale, of one of the mould carriers in receiving position.
Figure 9:
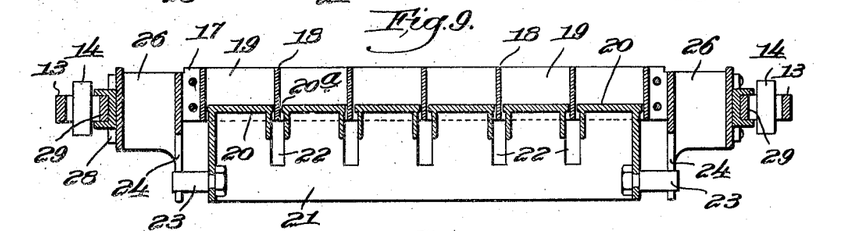
Fig. 9 is a longitudinal, vertical cross-section of the device of Fig. 8.

As viewed in Fig. 1, the chain 13 moves in a counter-clockwise direction, and the moulds moving with the upper run of chain, are positioned as indicated in Figs. 8 and 9. As thus arranged, the mould cavities may receive a charge from the chute 2, and as the moulds pass on beneath the wheel 3 and the scraper 4, the charge is compacted in the mould and properly leveled off. The moulds then continue to travel to the left and down over the sprocket wheel 6. At this point it is necessary to apply covers or pallets to the open tops of the mould cavities in order to prevent spilling of the contents therefrom.

Figure 4:
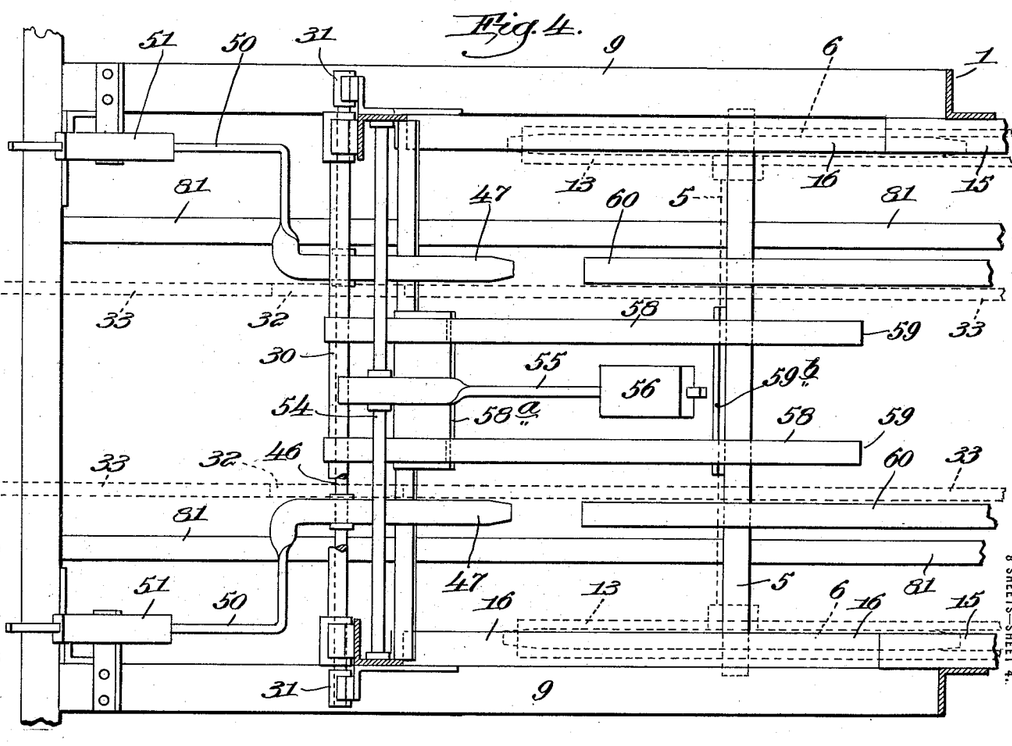
Fig. 4 is a fragmentary plan view of the pallet feeding end of the machine but omitting many of the operative elements.

The mechanism for applying the pallets is illustrated in detail in Fig. 2. In this figure, a transverse shaft 30 is shown, this shaft being mounted in fixed bearings as at 31, Figs. 1 and 4, and being constantly driven by means of any desired mechanism. Upon this shaft are mounted sprocket wheels 32 over which pass a pair of sprocket chains 33. These chains also engage a pair of idle sprocket wheels 34 mounted in suitable bearings at 35 and over a second pair of idle sprocket wheels 36 at the discharge end of the machine, the arrangement of which will be described at greater length hereinafter. The sprocket chains 33 are of such a length as to provide a very considerable amount of slack therein for a purpose which will be apparent as the description proceeds.

Figure 11:
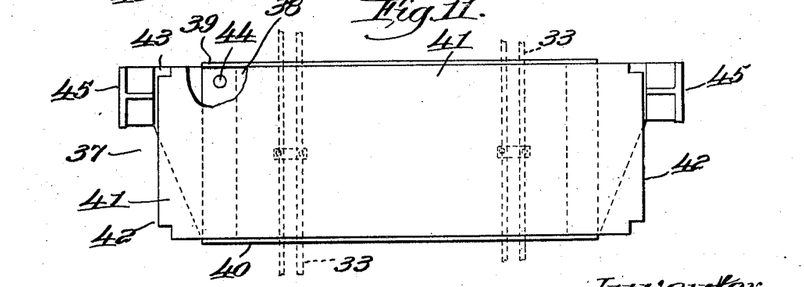
Fig. 11 is a plan view of a pallet carrier with a pallet resting therein.

Secured to the chains 33 at intervals are pallet carriers 37. These pallet carriers comprise substantially flat, transversely extending plates 38 having their longitudinal edges flanged upwardly as indicated at 39, 40 (Fig. 11). These carriers thus form open-topped pans in which may be laid the pallets or mould covers 41. These mould covers may be of any usual form and as herein shown consist of rectangular sheets of metal of a size to extend over the several mould cavities in one of the mould carriers 17. The edges of such plates are rolled down as indicated at 42 whereby to strengthen such pallets and also to assist in the handling of the same. As will be evident from inspection of Fig. 10, the pallets are substantially longer than the portions 38 of the pallet pans and thus project beyond the ends of the latter.

Yoke members 43 are riveted as at 44 to the member 38 and extend outwardly beyond the outer edges of the pallet resting in the pallet pan. The outer extremities of the yoke members 43 are prolonged in an upward direction to form driving lugs as indicated at 45, the parts being so arranged that such lugs or extensions may contact with the respective wear plates 27 carried by the parts 26 of the mould carriers A pair of holdback latches are provided for positioning the pallet pans for engagement with the corresponding mould carriers as the latter pass down about the sprocket wheels 6. These holdback devices are preferably formed as levers, pivoted upon a shaft 46, such levers comprising the arms 47 which extend downwardly and toward the sprocket wheels 6. Adjacent their lower ends the arms 47 are provided with off-set portions 48 (see Fig. 13) forming in effect, shelves upon which the lower edges of the pallet carriers may rest as they move downwardly from over the sprocket wheels 32. It may here be stated that by reason of the driving of the sprocket wheels 32 in a clockwise direction, the chains 33 with their pallet pans are constantly fed toward the sprocket wheels 6, but as the chains 33 are slack, a pallet pan when reaching the shelf-like members 48 will be arrested thereby and as the chains continue to feed, slack loops or bight, such as indicated at 49, will be formed in the chains. For holding the lever arms 47 in operative position, the opposite arms 50 of such levers may be provided with adjustable weights 51, whereby the degree of resistance to downward movement of the pallet pans may be adjustably determined.

As the pallet pans move downwardly from the sprocket wheels 32, it is evident that the pallets therein approach a vertical position from which they might be accidently dislodged by the jar and vibration of the machine. For preventing such accidental occurrence, a retainer arm 52 is provided, such arm, if desired, being of resilient material and provided with a portion 53 adapted to rest against the pallets within the pallet pans. The arm 52 forms a portion of a lever member pivoted upon a transverse shaft 54, such lever member being also provided with an arm 55 having an adjustable counter weight 56.

As additional means for preventing the displacement of the pallets from the pans, short lengths of heavy chain, such as 57, may be attached at their upper ends to the shaft 54, from which they depend into such position that they drag over the descending pallets, thus overcoming any tendency of the latter to turn about their lower edges and to fall from the pans. While both the chains 57 and the arm 52 have been shown as proper means for retaining the pallet in its pan, it may be found under some circumstances that devices of but one type are necessary.

As have been above pointed out, the pallet carrier chains 33 are quite slack and it is thus necessary to provide some means to guide the pallet carriers in their downward movement in order that they may properly register with the corresponding moulds carried by the chains 13. For this purpose, curved guide rails 58 are provided, such guide rails being suspended if desired, from the shaft 30 and extending downwardly in a generally curved direction to the point 59, in a plane below shaft 5, being positioned at intervals by supports as 58ª, 58ᵇ. While these rails may be rigid, it is preferred to form them of resilient or spring like material such as spring steel, as by the use of such material it is unnecessary to employ such extreme accuracy in manufacture, while at the same time the resiliency of the rail serves to compensate to some extent for slight irregularities in the operation of the moving parts such as may be caused by the accumulation of mud thereon. As the pallet carriers move downwardly from the sprocket wheel 32 they rest upon the rails 58 and are thus supported thereby in their further downward movement.

In the operation of the parts thus far described, it will be apparent that as the mould carriers move downwardly over the sprocket wheels 6, the wear plates 27 carried by the moulds will be brought into contact with the outwardly projecting lugs or extensions 45 of that pallet carrier which has been retarded by the holdback devices comprising the shelf-like off-sets 48. Immediately upon contact of the wear plates of the mould carriers with such lugs, the pallet carriers are subjected to pressure sufficient to cause the lever member 47 to swing downwardly, thus releasing the pallet carrier which is then moved downwardly along the guide rails 58 by positive engagement with its corresponding mould carrier. As the pallet carrier moves downwardly, it gradually approaches the mould carrier until the pallet is caused to register with the open end of the mould whereby to cover the same. Due to the slack bight in the chain 49 to the rear of the retarded pallet carrier, it is possible for the mould carrier to impart its own speed of movement to the pallet carrier without interference from the chain 33. Furthermore, as the mould carrier and pallet carrier continue to move about the center of the sprocket wheel 6, the pallet carrier is constrained to move at exactly the same speed as the mould carrier so that no slipping of the pallet relatively to the mould can take place.

Adjacent the terminal ends 59 of the rails 58 are arranged the forward ends of rails 60, such rails extending to the discharge end of the machine where they may be provided with downwardly directed portions 61 for a purpose hereinafter mentioned. These rails may be considered as forming continuations of the rails 58, in function at least, although not necessarily aligned therewith, and along the upper surfaces of said rails the pallets may be caused to slide as they travel toward the discharge end of the machine. The main portion of the rail 60 is substantially horizontal, and spaced above the same, though not in the same vertical plane therewith, are the ejector rails 62 (Fig. 1). These ejector rails are so positioned as to contact with the upper edges of the ejector devices 21 of the mould carriers as the moulds move along with the lower run of the chain 13.

Referring to Fig. 1, the upward inclination of the rails 16 upon which the mould carrier chains 13 are supported causes such chains gradually to approach the rail 62 as they move toward the discharge end of the machine. The relative movement of the mould carrier and ejector device occasioned by this arrangement serves to move the ejector device downwardly relatively to the mould cavities, whereby the moulded shapes are forced therefrom and are left standing upon the pallet which is still supported by the pallet carrier or pan.

Figure 3:
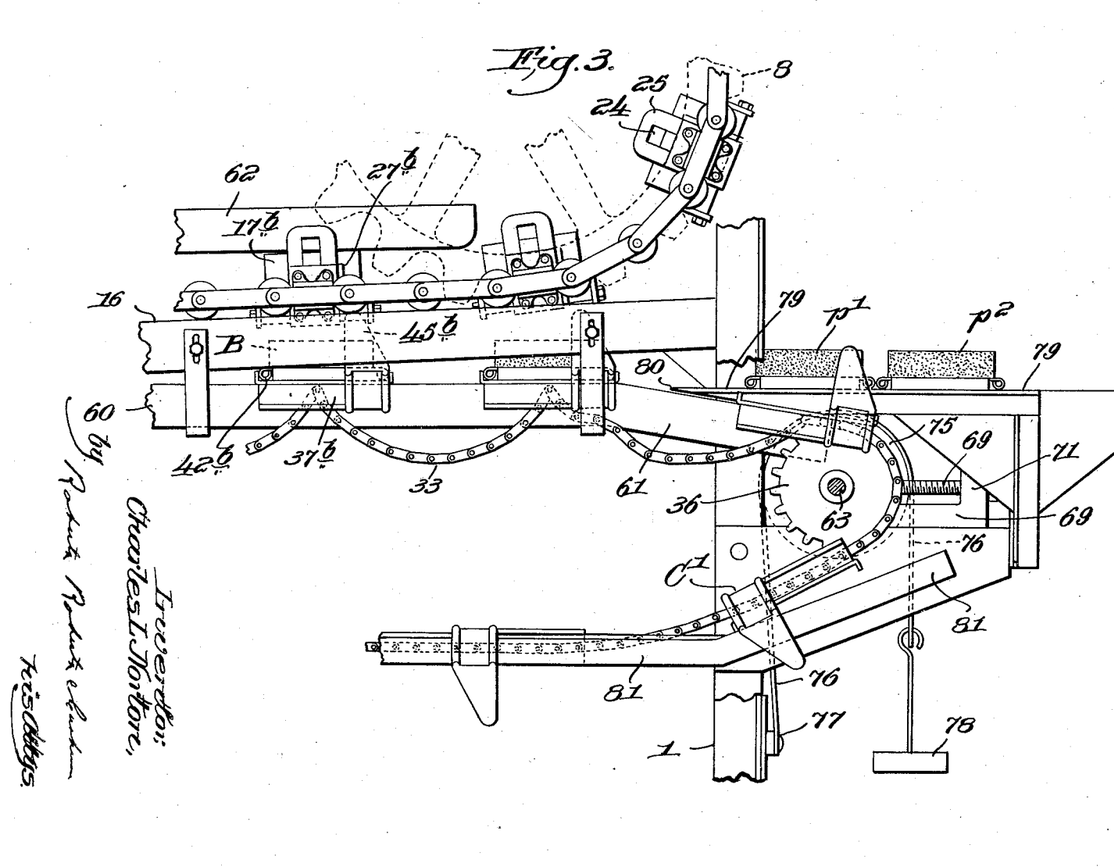
Fig. 3 is a view similar to Fig. 2 but illustrating the discharging end of the machine.

In Fig. 3, the moulded shape B is indicated in dotted lines as having just been deposited upon its pallet 42ᵇ, but the pallet carrier 37ᵇ is indicated as still being driven by engagement of its extension 45ᵇ with the wear plate 27ᵇ of the mould carrier 17ᵇ. The next pallet carrier to the right is shown as having parted company with its corresponding mould carrier and is thus no longer driven thereby but still retains its pallet with the moulded shape thereon.

Figure 5:
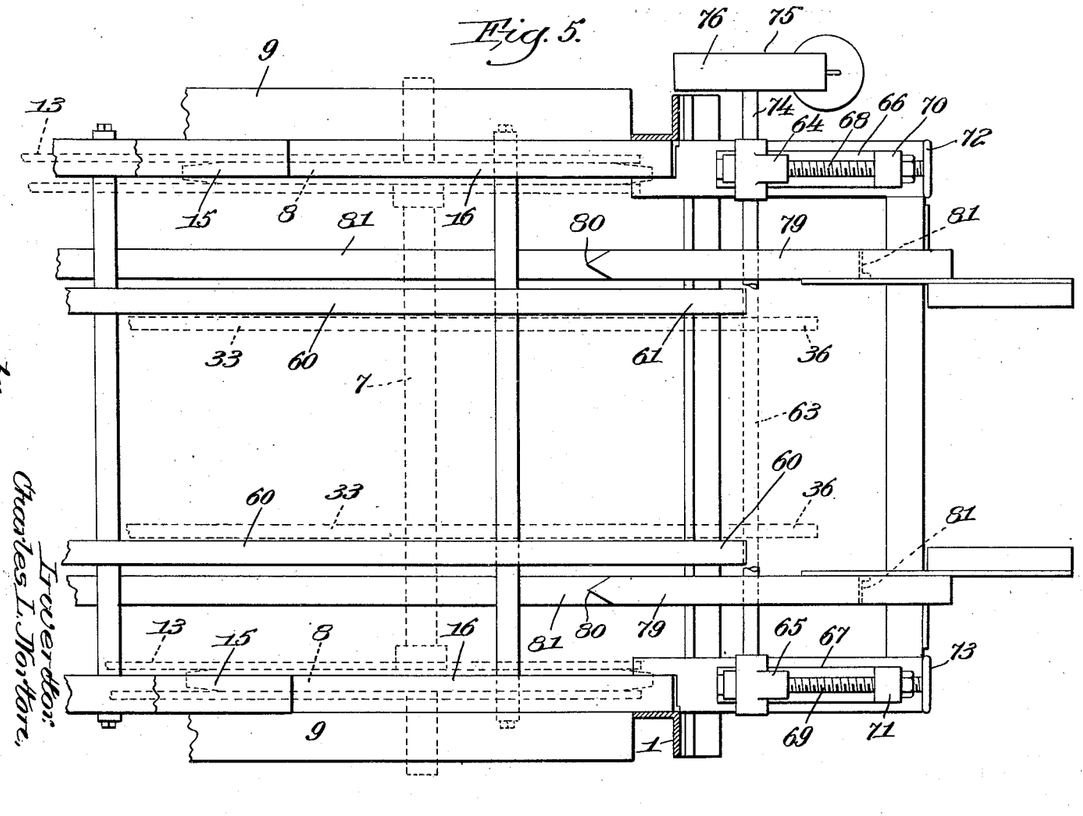
Fig. 5 is a view similar to Fig. 4 but illustrating the discharge end of the machine.
Figure 6:
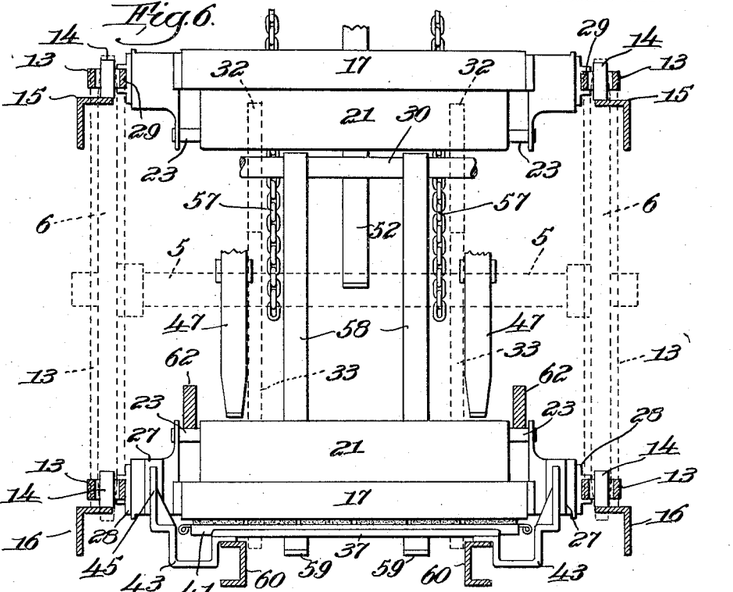
Fig. 6 is a fragmentary, vertical cross-section on a line such as $a$—$b$ Fig. 1, parts being omitted for clearness of illustration.
Figure 7:
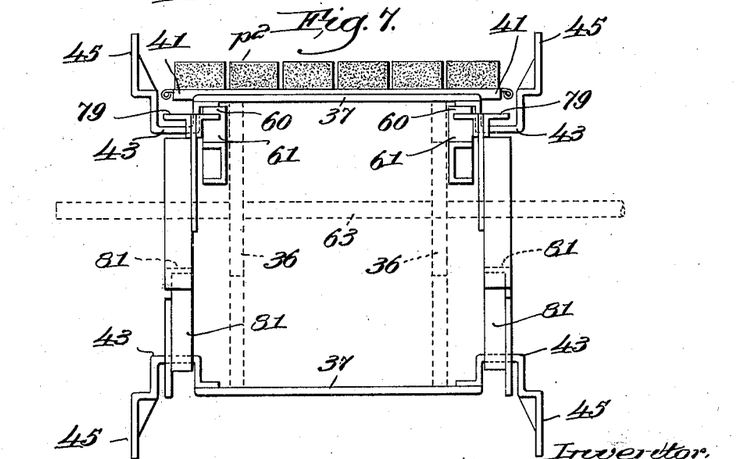
Fig. 7 is an end elevation, parts being omitted, of the discharge end of the machine.

At the discharge end of the machine the sprocket chains 33 which connect the various pallet carriers pass about the sprocket guide wheels 36 as previously described. The wheels 36 (see Figs. 3 and 5) are mounted upon a shaft 63 supported at its opposite ends in adjustable bearing lugs 64, 65, respectively. These bearing lugs may be mounted to slide upon guideways 66, 67 respectively and may be manually adjusted by means of threaded shafts 68, 69 engaging fixed nut members 70, 71. Hand wheels 72, 73 may be employed for turning such shafts whereby to adjustably determine the amount of slack in the chain 33.

One end 74 of the shaft 63 extends beyond its bearing and is provided with a brake pulley 75. A brake band 76 passes over this pulley, having one end 77 fixedly secured to the frame and having a weight 78 fastened to its other end. This brake device serves to prevent the free rotation of the shaft 63 and thus prevents the drive sprockets 32 at the other end of the machine from taking up the slack in the upper runs of the chains 33.

In a plane above the sprocket wheels 36 are provided a pair of pallet separator fingers 79, such fingers terminating in points 80. The fingers 79 are so arranged as to lie in the planes of the yokes 43 of the pallet carriers as the latter approach the discharge end of the machine and as the pallet carriers pass down the inclines 61 of the rails 60 the fingers 79 enter between the lower portions of the yokes 43 and the projecting end portions of the pallets 41. The pallets are thus separated from the pallet carriers and are caused to rest upon the upper surfaces of the fingers 79. Moulded shapes carried by pallets thus positioned are indicated at P¹, P² Fig. 3. After the separation of the pallets from the pallet carriers, the latter travel down over the sprocket wheels 36 and into a position such as indicated at C¹, Fig. 3.

A pair of rails 81 are secured to the frame of the machine and extend substantially in the vertical planes of the fingers 79, respectively. As the empty pallet carriers move downwardly, they are caused to rest upon the rails 81 and are supported thereby in their return travel toward the opposite end of the machine. As the empty pallet carriers move upwardly between the sprocket wheels 34 and 32, the operator may place fresh pallets therein and thus the operation of the machine may continue.

It is to be noted that by the provision of the slack loop 49 during the feeding of the pallet carrier chain toward the sprocket 6, it is possible to provide a positive drive of the pallet carrier by means of the moulds supported upon the chain 13, although the linear speed of the pallet carrier in approaching the corresponding mould carrier may be somewhat different from that of the latter. This slack also provides for the relatively wide change in linear velocity of the mould carrier and pallet carrier as they move from the arcuate path about the center of shaft 5 into the tangential path provided by the rails 16 and 60. A positive driving engagement between the mould carrier and pallet carrier is thus possible throughout their co-operating movement while at the same time it is possible to mount the pallet carriers upon a continuous chain for facilitating their return to loading position.

Figure 14:
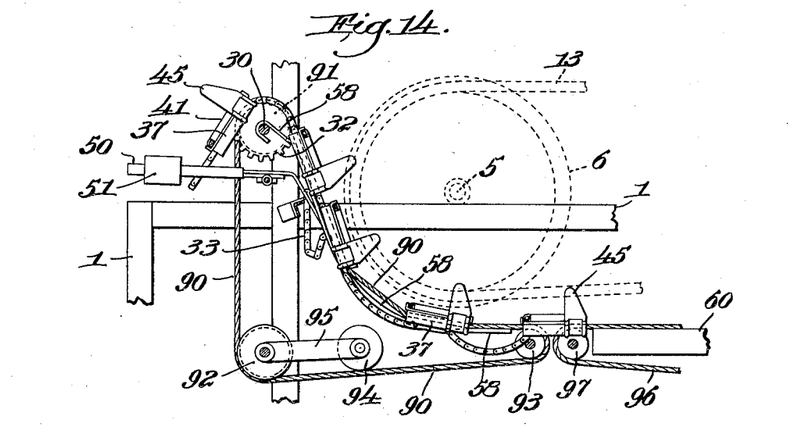
Fig. 14 is a fragmentary side elevation of diagrammatic character, illustrating a modified arrangement for supporting and guiding the pallet carriers.
Figure 15:
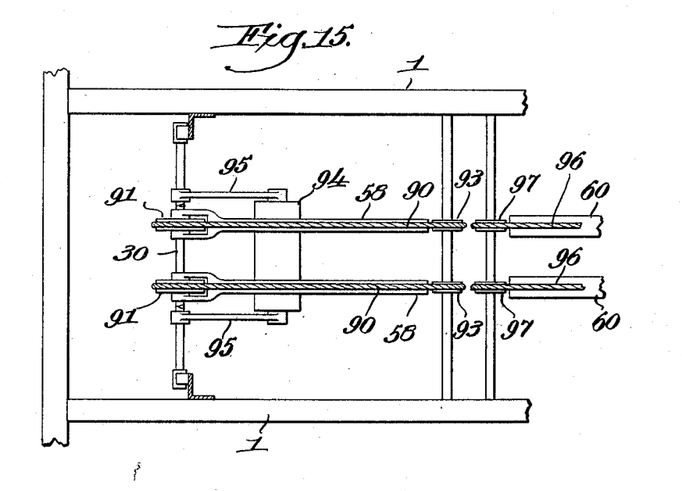
Fig. 15 is a plan view corresponding to Fig. 14.

In the modified arrangement illustrated in Figs. 14 and 15 there may be provided, in addition to the rails 58, a secondary supporting and guiding means for the pallet carriers in their downward movement into engagement with the corresponding moulds. This secondary guiding and supporting means preferably comprises a pair of cables 90 passing over guide pulleys at 91, 92 and 93. For maintaining these cables in taut condition, a weighted roll or rolls such as 94 may be provided, carried upon the ends of lever arms 95. If desired, such endless cables 90 may be substituted for the rails 58, but in the preferred arrangement as shown in Fig. 15, the cables 90 are arranged to overlie the rails 58, whereby to reduce the friction of the carriers in passing over the latter. While it is contemplated that the cables 90 whether used with or without the rails 58, may be driven at a peripheral speed corresponding substantially to that of the linear velocity of the chains 33, it is preferred to mount the cables 90 upon idle pulleys permitting the frictional drag of the pallet carriers in resting upon said cables to move the latter. If desired, the cables 90 might be continued to the discharge end of the machine, proper guide pulleys being provided. As herein shown, however, second endless cables 96 passing over pulleys such as 97 at the opposite ends of the machine are provided, such cables if desired, taking the place of the rails 60. In the preferred arrangement however, such cables 96 overlie the rails 60 and act to relieve the latter of the frictional drag of the pallet carriers. The cables 96 may also if desired, be positively driven, although it is not considered that this is essential to the proper operation of the machine.

While the term "pallet pan" has been employed as describing means suitable for holding the pallets while presenting the same to the moulds, it is contemplated that the pallets might be held in other ways than by laying them in a receptacle, and the term "pallet pan" has been employed herein in a generic sense as implying any desired form of supporting means whereby the pallet might properly be sustained and presented to the mould. Although moulds of a specific type have herein been disclosed, it is also evident that the invention is not necessarily limited to any specific form of mould but that the pallet applying mechanism might be employed wherever it were desirable to associate a mould cover with a traveling mould.

While various details of construction have been specifically disclosed herein, it is to be understood that changes and rearrangement of parts for improved economy of operation or cheapness of manufacture, as well as changes in minor details and re-arrangements of elements may be made without in any manner departing from the spirit of the present invention.

I claim:

1. A machine for moulding plastic shapes comprising a mould movable in a path comprising an arcuate portion, an open topped pallet pan for presenting a cover member in position for engagement with said mould while traversing the arcuate portion of its path, and means for causing said mould and pan to travel at the same speed.

2. A mechanism of the class described comprising an open topped mould, means for moving such mould in a curved path, a carrier device comprising a receptacle for holding a cover for presentation in position for engagement with the open side of the mould while moving in such path, and means for positively moving said mould and receptacle in synchronism.

3. A moulding machine for plastic shapes comprising an open topped mould, means for moving said mould in a curvilinear path, an open topped receptacle for holding a cover for said mould, means for moving said receptacle into proximity to the moving mould to bring the cover member into engagement with the open side of the latter, and mutually engageable elements movable with the mould and receptacle respectively for causing said receptacle to move in exact consonance with the mould subsequent to such engagement.

4. A machine of the class described comprising a mould, means for moving said mould in a curved path, means for supporting a mould cover for engagement with the mould while so moving, and positively acting means for thereafter moving said supporting means in consonance with the mould.

5. A brick moulding machine comprising an endless conveyer, a mould supported thereby for movement along an arcuate path, a second endless conveyer, a carrier for a mould cover mounted thereon for movement in a path concentric with that of the mould, means for so moving said conveyers as to bring said mould into position for engagement by a cover held by said carrier, and positively acting means for moving said carrier at the speed of the mould subsequent to said engagement.

6. A moulding machine comprising means for moving a mould, means for moving a mould cover at a speed different from that of the mould, whereby to bring it into proximity to the moving mould for engagement therewith, and means for causing said mould cover to travel at a speed equal to that of the mould after such engagement.

7. A machine for moulding plastic shapes comprising an endless chain, a series of moulds carried thereby for movement in a path comprising an arcuate portion, means for moving mould covers or pallets successively into position for engagement with moulds of said series while traversing such portion of their path, and positively acting means for causing such engaged moulds and pallets subsequently to travel at the same speed.

8. A machine for moulding bricks comprising an endless conveyer, a series of moulds mounted thereon, a second endless conveyer having a series of pallet carriers thereon, said conveyers having portions thereof extending in substantially concentric paths, and means for driving said conveyers, said second conveyer being constructed and arranged to permit driving engagement between elements of said moulds and respective pallet carriers whereby to move the latter in consonance with the moulds and at a speed different from the speed at which such second conveyer is driven, throughout the parallel portions of their respective paths.

9. A machine for moulding plastic shapes having a series of moulds movable in a path comprising a curved portion and a substantially straight portion, an endless conveyer for pallets, and means for driving said conveyer at a predetermined speed, said conveyer being constructed and arranged to present pallets in position for engagement with successive moulds at the curved portion of said path, and at a speed different from the speed at which such conveyer is driven and to permit movement of such pallets in consonance with their respective moulds along the straight portion of said path.

10. A brick moulding machine comprising an endless conveyer whose elements move in a path comprising respectively a circular arc and a tangent thereto, moulds mounted on said conveyer to move therewith, a second endless conveyer for presenting pallets to the respective moulds, and having a slack run arranged adjacent said arcuate and tangential portions of the path of travel of the moulds, and pallet carriers secured to said second conveyer.

11. A machine of the class described comprising a series of moulds movable successively in a path comprising an arcuate portion, an endless conveyer having pallet carriers thereon, said conveyer having a slack portion, and means for driving said conveyer whereby to feed such slack portion into proximity to the arcuate portion of the path of movement of said moulds.

12. A machine having a series of moulds movable in a predetermined path and a slack chain having pallet carriers mounted thereon, said chain being constructed and arranged to bring its pallet carriers successively into juxtaposition to the path of said moulds whereby to permit engagement of elements of a mould and carrier respectively.

13. A moulding machine comprising an endless conveyer, a second endless conveyer, said conveyers being arranged in substantially the same vertical plane, moulds supported by said first conveyer, pallet carriers mounted on said second conveyer, said second conveyer being slack in that run thereof lying adjacent said first conveyer, and interengageable elements carried by the moulds and pallet carriers rspectively whereby the latter at the slack portion of their conveyer may be moved positively by said moulds.

14. A machine for moulding plastic shapes comprising a series of movable moulds, a series of movable carriers for holding pallets for presentation to successive moulds of the series, and means independent of said moulds for imparting movement to said carriers.

15. A machine comprising a series of moulds, means for so moving said moulds that the distances between the pallet engaging surface of successive moulds varies during the travel of said moulds, and an endless conveyer having pallet carriers mounted thereon for presenting pallets to the moulds, said conveyer being constructed and arranged to permit its carriers to maintain registry with respective moulds regardless of the varying distances between successive ones thereof.

16. A brick moulding machine comprising mould moving means, a mould movable thereby and having an outstanding element, and means for feeding a pallet carrier into a position wherein said element may engage an element of the latter, thereby to impart movement to said carrier independent of its feeding means.

17. A machine of the class described having an endles series of moulds movable in a curvilinear path, each mould having an outstanding lug, an endless chain having a series of pallet pans thereon, each of said pans having a projecting ear, and means for moving said chain whereby to feed its pans into position wherein their respective ears may be engaged by lugs of successive moulds during the movement of the latter whereby to impart positive driving movement to said pans.

18. In combination in a machine having an endless moving chain with moulds secured thereto, an endless conveyer having pallet pans thereon, means for guiding and driving said conveyer whereby a slack run thereof is caused to lie adjacent a portion of said chain, and means carried by the respective moulds for engaging the moving pans fixed to the slack run of the conveyer.

19. A machine of the class described comprising a sprocket wheel, a mould conveyer chain trained about the same, moulds thereon, a pallet carrier supporting chain, means for moving said latter chain to feed its carriers into proximity to said conveyer chain as the latter passes over its sprocket, and means for temporarily retarding said carriers whereby to permit positive engagement therewith by corresponding moulds.

20. A machine for moulding brick comprising a wheel, an endles conveyer trained thereover, moulds secured upon said conveyer, an endless, slack chain having pallet carriers thereon, means for moving said chain whereby to present its carriers opposite that portion of said conveyer which passes over said wheel, and an automatically acting latch device for retarding successive carriers whereby to position them for engagement by corresponding moulds.

21. A machine for moulding plastic shapes comprising a sprocket wheel, an endless chain trained thereover, moulds fixed to said chain, a second chain having pallet carriers thereon, a drive wheel therefor adjacent said sprocket wheel, said wheel being constructed and arranged to feed a slack run of said chain with its carriers whereby to present such slack portion opposite that portion of said first chain which passes over the sprocket wheel, and a counter-weighted latch lever for engaging and temporarily holding carriers located in the slack portion of the chain whereby to permit engagement therewith by corresponding moulds.

22. A machine for moulding brick comprising an endless chain passing over a sprocket wheel, moulds on said chain, a slack conveyer for presenting pallet pans in position for registry with moulds passing over said sprocket, and means for maintaining said pans and moulds in registry as the latter continue their movement.

23. A machine for moulding plastic shapes comprising a series of moulds movable in a path comprising a circular arc, a flexible endless conveyer having pallet pans thereon, means for moving said conveyer whereby to bring a slack run of the same with its pans into position adjacent the arcuate portion of the path of said moulds to permit registry of the pans with the moulds, and resilient supporting means for holding such pans and moulds in registry during the remainder of the travel of the latter along such arcuate path.

24. In combination in a machine of the class described having moulds moving in an arcuate path, pallet carriers movable into registry with said moulds, and curvilinear resilient rails for maintaining said moulds and pans in registry while traversing such arcuate path.

25. In a machine of the class described, in combination, a plurality of moulds movable in an arcuate path, pallet carriers movable into registry with corresponding moulds, and guide rails adjacent the arcuate portion of the path of said moulds for maintaining said moulds and carriers in registry.

26. A molding machine comprising a series of moulds movable in a path having arcuate and straight portions, pallet carriers movable into position for registry with successive moulds at a point in the arcuate portion of said path, and a curved rail for maintaining said moulds and carriers in registry throughout the remainder of said arcuate portion and the succeeding straight portion of said path.

27. A machine for moulding brick comprising a series of moulds movable in an arcuate path, pallet carriers movable into position for registry with successive moulds at a point in such arcuate path, and guide means for retaining such carriers and moulds in registry comprising an endless anti-friction band engageable with the moving carriers.

28. A brick moulding machine comprising a series of moulds movable in a predetermined path, a series of loosely connected pallet carriers movable into position for engagement with elements of corresponding moulds, and an endless flexible band constructed and arranged to restrain such carriers from movement away from their respective moulds.

29. A machine of the class described comprising a series of moulds movable in a predetermined path, a connected series of pallet carriers movable successively into position for driving engagement with elements of corresponding moulds, and guiding and retaining means for said carriers comprising a plurality of endless, movable bands constructed and arranged for successive engagement by carriers of the series.

30. A moulding machine comprising a series of moulds movable in a path comprising curved and straight portions, a series of moulds engaging elements, a slack chain for connecting the elements of said series, said elements being constructed and arranged for engagement with corresponding moulds of the series whereby to receive movement from the latter, and supporting and retaining means for said elements comprising a movable endless band having a portion thereof substantially concentric with the curved portion of said mould path, and a second movable endless band having a run thereof substantially parallel to the straight portion of said path.

31. A brick moulding machine comprising a series of moulds movable in a predetermined path, a series of pallet carriers movable in a path of which a part is substantially parallel to a portion of the path of movement of said moulds, an endless chain for supporting said carriers and means for providing slack in said chain at the parallel portion of said paths.

32. A brick moulding machine comprising a series of moulds movable in a path, a portion of which is substantially straight, a series of pallet carriers, an endless conveyor for connecting said carriers constructed and arranged to permit them to move in a path substantially parallel to the aforesaid straight portion of the mould path, a drive wheel for said conveyor adjacent one end of said straight portion, a guide wheel for said conveyer adjacent the other end thereof, and brake means for retarding the free rotation of said guide wheel.

33. A brick moulding machine comprising a continuous pallet carrier supporting chain, a drive sprocket adjacent one end of the chain, a guide sprocket adjacent the other end of said chain, and brake means for retarding the free rotation of said guide sprocket, the parts being so constructed and arranged as to provide a slack run of chain between said drive sprocket and guide sprocket.

34. A brick machine comprising a conveyer for a series of mould elements, and means for moving said conveyer, said conveyer being constructed and arranged to permit relative movement of successive mould elements mounted thereon.

35. A machine for moulding plastic shapes comprising a flexible conveyer, a series of pallet pans fixedly secured thereto, and means for moving said conveyer, said conveyer being constructed and arranged to permit relative movement of successive pallet pans.

36. A machine of the class described comprising an endless chain, a series of pallet holders secured thereto, and means for imparting movement to said chain, said chain being constructed and arranged to provide substantial slack between successive holders whereby to permit relative movement of the latter at certain portions of the length of the chain.

Signed by me at Boston, Massachusetts, this 15th day of April 1921.

CHARLES L. NORTON.